Aug. 10, 1948.　　K. W. HILDENBRAND　　2,446,589
SPACER
Original Filed April 22, 1940
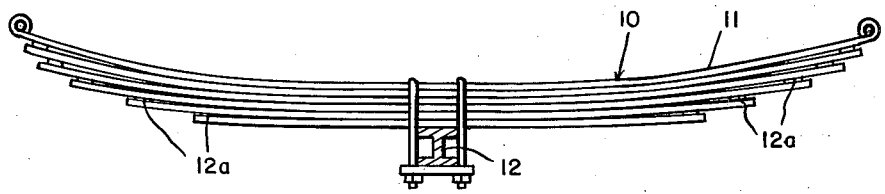
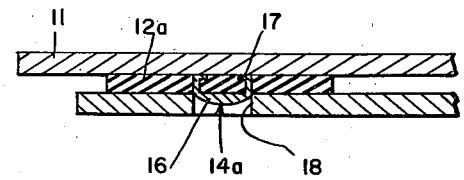
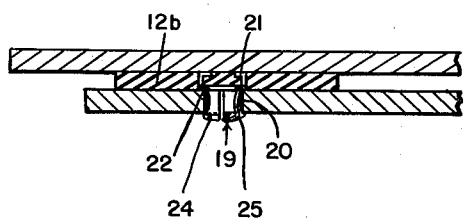
INVENTOR.
KENNETH W. HILDENBRAND
BY
Whittemore Hulbert + Belknap
ATTORNEYS Patented Aug. 10, 1948

2,446,589

UNITED STATES PATENT OFFICE 2,446,589

SPACER

Kenneth W. Hildenbrand, Monroe, Mich., assignor to Monroe Auto Equipment Company, Monroe, Mich., a corporation of Michigan Original application April 22, 1940, Serial No. 331,037, now Patent No. 2,355,801, dated August 15, 1944. Divided and this application March 7, 1944, Serial No. 525,419

1 Claim. (Cl. 267—49)

This invention relates generally to spacers and refers more particularly to spacers of the type employed between adjacent parts to insulate the parts from contact with each other, or to control the friction between the parts.

This is a division of my application, Serial No. 331,037, filed April 22, 1940 (Patent No. 2,355,801, issued August 15, 1944).

In the manufacture of numerous different assemblies, such, for example, as motor vehicles, it is oftentimes desirable to prevent contact between certain of the parts to either eliminate noise resulting from relative movement of the parts, or to control the friction between the parts. One particular instance in the manufacture of a motor vehicle where it is desirable to eliminate noise and control the friction between adjacent relatively movable parts is in the construction of the leaf springs forming a part of the suspension system. Leaf springs are usually composed of a plurality of superimposed individual leaves installed in a manner to permit relative sliding movement between the leaves during operation of the vehicle. The friction resulting from relative movement between adjacent leaves controls to a large extent the action of the spring and has a tendency to develop a noise or squeak after repeated operations.

It has been proposed to not only eliminate the noise resulting from relative shifting movement of the leaves of the spring but, in addition, to control the friction of the spring by interposing inserts between adjacent leaves of a spring, and it is one of the principal features of this invention to simplify, as well as reduce the cost of installation of the inserts. It is a further advantageous feature of the present invention to provide a spacer capable of being inexpensively manufactured on a production basis and having provision for either attaching or positioning the same on one of two adjacently positioned parts to space the latter from each other.

With the foregoing, as well as other objects in view, the invention resides in the novel construction of the several embodiments of the spacer about to be described.

In the drawing:

Figure 1 is a side elevational view of semi-elliptical leaf spring having spacers or inserts constructed in accordance with this invention;

Figure 2 is an enlarged sectional view through two leaves at one end of the leaf spring; and Figure 3 is a similar sectional view of a modified form of construction.

Although the present invention may be advantageously used in practically all cases where it is desirable to space adjacent parts from contact with each other, nevertheless, it finds particular utility when employed in a leaf spring construction to eliminate the noise resulting from relative shifting movement between adjacent spring leaves and to also control the friction between the leaves. Accordingly, I have selected the latter use for the purpose of illustrating the various embodiments of this invention.

In Figure 1 of the drawing, I have shown a conventional type of semi-elliptical leaf spring 10 having a plurality of superposed individual leaves 11 clamped at the center thereof to the axle 12 of the vehicle. In accordance with conventional practice, the lengths of the leaves 11 progressively decrease from the top leaf to the bottom leaf and the opposite ends of the top leaf are connected to the sprung weight of the vehicle according to orthodox practice. With this construction, it will be noted that relative movement between the sprung and unsprung assemblies of the vehicle causes a shifting movement of the leaves 11 of the spring relative to each other. The friction between adjacent spring leaves controls to a large extent the action of the spring and, in order to regulate this friction, inserts 12a or 12b of friction material are inserted between adjacent leaves at the free ends thereof. This friction material is preferably of a non-metallic composition and also serves to space the major portions of the spring leaves from metallic contact with each other so that any noise resulting from relative shifting movement of the leaves is reduced to the minimum.

In the embodiment of the invention illustrated in Figure 2, the button 14a comprises the head of the metal staple 16 having the prongs 17 forced through the friction disc 12a and crimped over the latter. With this construction, the spring leaves may be provided with openings 18 therethrough for receiving the heads 16 of the staples to position the friction discs relative to the spring leaves. This construction is inexpensive to produce and may be readily assembled.

The modification shown in Figure 3 differs from the above described form in that the friction disc 12b is provided with a snap fastener 19 engageable within an opening 20 formed in the leaf spring to secure the friction disc in place. In the present instance, the snap fastener 19 is secured to the friction disc by suitable prongs 21 projecting from the base 22 of the fastener and adapted to be crimped over the top surface of the disc in the manner clearly shown in Figure 3. The snap fastener, selected for the purpose of illustration, is of relatively simple inexpensive construction having a plurality of spring fingers 24 adapted to extend through the opening 20 and terminating in enlarged portions 25 frictionally engageable with the underside of the leaf spring to prevent accidental removal of the friction disc.

The above construction is particularly advantageous in that it appreciably simplifies and expedites assembly of the leaf spring. With this construction, the friction discs may be attached to each spring leaf before the latter are assembled to provide the construction shown in Figure 1, and there is no possibility of movement of the friction discs during this assembly. Attention may be called to the fact that the construction shown in Figure 3 is especially applicable for installation at other parts of the vehicle where it is desired to space adjacent parts from each other.

What I claim as my invention is:

A leaf spring assembly comprising a plurality of leaves arranged in successive pairs of different lengths from a common point of fixed surface contact, each of the leaves, except the longest leaf of the series, having an aperture in its end portion beyond the end of the contacting shorter leaf, a bearing element, a support to which the bearing element is secured, said support being positionable in the aperture of each leaf, the bearing element being of a compressible material and greater in peripheral dimension than the said aperture positioned between the leaves and separating the same for a distance from their ends determined by the thickness of the bearing element therebetween.

KENNETH W. HILDENBRAND.

REFERENCES CITED

The following references are of record in the file of this patent:

UNITED STATES PATENTS

| Number | Name | Date |
|---|---|---|
| 1,552,529 | Woodhead | Sept. 8, 1925 |
| 1,927,627 | Calking et al. | Sept. 19, 1933 |
| 1,963,814 | Walters | June 19, 1934 |
| 2,019,441 | Watson | Oct. 29, 1935 |
| 2,028,299 | Swinton | Jan. 21, 1936 |
| 2,155,073 | Ziska | Apr. 18, 1939 |
| 2,175,230 | Thompson | Oct. 10, 1936 |
| 2,221,488 | Paton | Nov. 12, 1940 |
| 2,227,300 | Dow | Dec. 31, 1940 |
| 2,268,784 | Thompson | Jan. 6, 1942 |
| 2,346,092 | Tollzien | Apr. 4, 1944 |